US012786249B2

(12) United States Patent
Arunachalam et al.

(10) Patent No.: US 12,786,249 B2
(45) Date of Patent: Nov. 3, 2026

(54) SYSTEMS AND METHODS FOR USING TRIGGERS AND EVENT METADATA TO JOIN MEETINGS

(71) Applicant: Cisco Technology, Inc., San Jose, CA (US)

(72) Inventors: Chidambaram Arunachalam, Apex, NC (US); Hazim Hashim Dahir, Wake Forest, NC (US); Keith Griffin, Oranmore (IE)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 18/163,076

(22) Filed: Feb. 1, 2023

(65) Prior Publication Data

US 2024/0259769 A1 Aug. 1, 2024

(51) Int. Cl.

*H04L 65/1063* (2022.01)
*G06Q 10/40* (2026.01)
*H04W 4/08* (2009.01)

(52) U.S. Cl.

CPC ......... *H04L 65/1063* (2013.01); *G06Q 10/40* (2026.01); *H04W 4/08* (2013.01)

(58) Field of Classification Search

CPC ............. H04L 65/1063; H04L 65/1069; H04L 65/1073; H04L 65/403; H04L 67/30; H04W 4/08; G06Q 10/101; G06Q 10/103; G06Q 10/107; G06Q 10/109; G06Q 50/01

USPC .......................................................... 455/416

See application file for complete search history.

(56) References Cited

U.S. PATENT DOCUMENTS 10,708,434 B1 * 7/2020 Scheet ................ H04L 65/1069
2007/0150583 A1 * 6/2007 Asthana ................. G06Q 10/06 709/224
2011/0271197 A1 * 11/2011 Jones ................... G06Q 10/101 715/753
2015/0256795 A1 9/2015 Chauhan
2019/0312918 A1 10/2019 Balasaygun et al.
2019/0392395 A1 12/2019 Valliani
2020/0396416 A1 * 12/2020 Jaynes ................ H04L 12/1822
2021/0409547 A1 * 12/2021 Channapragada .. H04L 12/1822
2022/0239778 A1 7/2022 Ittelson
2022/0245948 A1 8/2022 Crary et al.
2023/0246861 A1 * 8/2023 Waibel .................. G06F 3/0482 709/204
2024/0146559 A1 * 5/2024 Ramoutar ........... H04L 12/1822

OTHER PUBLICATIONS

Sidi Lu; Weisong Shi, "The Emergence of Vehicle Computing", Department: Emerging Internet Technologies; Wayne State University, Detroit, MI 48202, USA; IEEE Computer Society, dated Jun. 18, 2021, 5 pages.

* cited by examiner

*Primary Examiner* — Maria El-Zoobi
(74) *Attorney, Agent, or Firm* — Baker Botts L.L.P.

(57) ABSTRACT

In one embodiment, a method includes receiving, from a meetings application, a request to register a trigger and registering the trigger with an actions manager. The trigger includes a target, an event, and an action set. The method also includes comparing the event metadata to the trigger. The method further includes communicating a response to the mobile device application.

20 Claims, 4 Drawing Sheets

SYSTEMS AND METHODS FOR USING TRIGGERS AND EVENT METADATA TO JOIN MEETINGS

TECHNICAL FIELD

The present disclosure relates generally to communication networks, and more specifically to systems and methods for using triggers and event metadata to join meetings.

BACKGROUND

Several teams in enterprise companies are global in nature, and team members often collaborate with remote participants in different time zones. As employees strive to have a work-life balance, there is an increasing trend of users taking virtual meetings on their daily commutes. For example, users may listen to virtual meetings on the way to their offices, on the way to dropping their children off at school, or on their way back home.

DESCRIPTION OF EXAMPLE EMBODIMENTS

Overview

Figure 1:
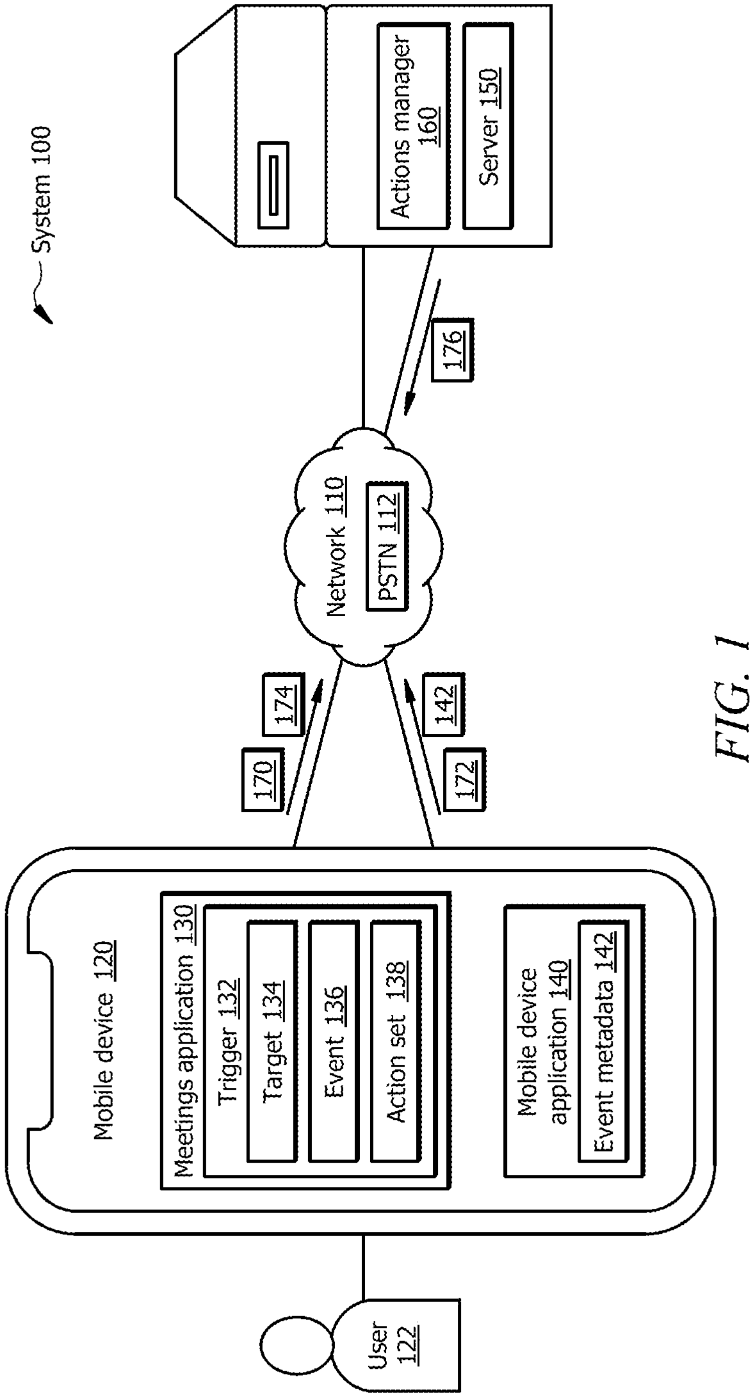
FIG. 1 illustrates a system for using a trigger and event metadata to join a meeting, in accordance with certain embodiments.

According to an embodiment, a network element includes one or more processors and one or more computer-readable non-transitory storage media coupled to the one or more processors and including instructions that, when executed by the one or more processors, cause the network element to perform operations. The operations include receiving. from a meetings application, a request to register a trigger and registering the trigger with an actions manager. The trigger includes a target, an event, and an action set. The operations also include comparing the event metadata to the trigger. The operations further include communicating a response to the mobile device application.

In accordance with certain embodiments, the operations include determining, in response to comparing the event metadata to the trigger, that the event of the trigger matches the event metadata. In some embodiments, the operations include instructing, via the response, the mobile device application to perform the action set defined in the trigger.

In accordance with certain embodiments, the operations include receiving a first registration request from the meetings application and/or registering the meetings application with the actions manager. In some embodiments, the operations include receiving a second registration request from the mobile device application and registering the mobile device application with the actions manager.

In accordance with certain embodiments, the target includes at least one of the following identifiers: a first identifier of the mobile device application and a second identifier of a user of the mobile device application. In some embodiments, the event includes a calling party number. In certain embodiments, the action set includes at least one of the following actions: answer, mute, and enter a predetermined dual tone multi-frequency (DTMF) number.

In accordance with certain embodiments, the meetings application and the mobile device application are stored on one of the following: a mobile device or a vehicular communication system. In accordance with some embodiments, the actions manager represents one of the following: a cloud service, an application stored on a mobile device, or an application stored on a vehicular communication system. In accordance with some embodiments, the action set is associated with a public switched telephone network (PSTN) audio connection.

According to another embodiment, a method includes receiving, from a meetings application, a request to register a trigger and registering the trigger with an actions manager. The trigger includes a target, an event, and an action set. The method also includes comparing the event metadata to the trigger. The method further includes communicating a response to the mobile device application.

According to yet another embodiment, one or more computer-readable non-transitory storage media embody instructions that, when executed by a processor, cause the processor to perform operations. The operations include receiving, from a meetings application, a request to register a trigger and registering the trigger with an actions manager. The trigger includes a target, an event, and an action set. The operations also include comparing the event metadata to the trigger. The operations further include communicating a response to the mobile device application.

Technical advantages of certain embodiments of this disclosure may include one or more of the following. This disclosure describes systems and methods that allow users to automatically join meetings without the need for user interaction. For example, certain embodiments of this disclosure use triggers and event metadata to automatically join a user to a virtual collaboration meeting through a PSTN connection. In certain embodiments, audio-related control settings are automatically enabled. For example, certain embodiments of this disclosure automatically turn on mute on a mobile device or natively within a vehicle upon entering the meeting, which prevents unwanted noise (e.g., noise associated with a vehicle, an airport, etc.) from interfering with the meeting. Certain embodiments described herein allow independent virtual meeting and calling applications running on the users' devices to register events of interest with an actions manager, retrieve action sets for well-known events, and execute the action sets, which provides a seamless and safe user experience. Certain embodiments of this disclosure automatically join users to meetings even when the virtual meeting participants have disabled their caller-id displays across the PSTN connection due to privacy reasons.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for using triggers and event metadata to join meetings. Users often leverage their mobile devices (e.g., smartphones) natively within their vehicles (e.g., cars, trucks, vans, SUVs, etc.) to join virtual meetings while they are driving. Currently, the user experience in such mobile scenarios is not at par when compared to joining the meeting from a static location such as a residence, an office, a hotel, etc. Currently, joining a meeting from a mobile device requires the user to perform several manual steps and to configure their preferred settings. For example, joining a meeting from a mobile device may require manual steps and/or configurations to initiate a callback at the mobile number, to answer the call using the phone application in the mobile device, to enable mute on the mobile device application, to disable mute on the meeting application to avoid double mute, and so on.

Currently, several steps are taken by the mobile phone user to join an audio meeting with audio connected across PSTN. The mobile phone user performs the following actions: (1) selects (e.g., presses a touch screen button on the mobile device) the "call me" feature in the meeting application: (2) enters or selects the number at which the mobile phone user would like to be called back: (3) answers the call by selecting (e.g., sliding) a touch screen button the mobile device: (4) selects the mute button to allow mute in the phone application: (5) selects the appropriate DTMF number (e.g., "#1") to join the audio bridge: and (7) disables mute in meeting application to avoid double mute.

Certain embodiments of this disclosure allow users to automatically join meetings without user interaction. Applications running in a vehicle or mobile device register with an actions manager running in the cloud. After the initial registration process, individual applications can register specific sets of actions to be taken when well-known events occur. This is done by registering a trigger that includes event and action details. All applications that have registered with the actions manager can communicate with the actions manager to determine whether any actions need to be taken when a well-known event occurs, which provides an efficient, hands-free solution for the user.

FIG. 1 illustrates a system 100 for using a trigger and event metadata to join a meeting, in accordance with certain embodiments. System 100 or portions thereof may be associated with an entity, which may include any entity, such as a business, company, or enterprise, that uses triggers and event metadata to join meetings. In certain embodiments, the entity may be associated with a web conferencing organization, a telecommunications company, and the like. The components of system 100 may include any combination of hardware, firmware, and software. For example, the components of system 100 may use one or more elements of the computer system of FIG. 4. In the illustrated embodiment of FIG. 1, system 100 includes a network 110, a PSTN 112, a mobile device 120, a user 122, a meetings application 130, a trigger 132, a target 134, an event 136, an action set 138, a mobile device application 140, event metadata 142, a server 150, and an actions manager 160.

Network 110 of system 100 is any type of network that facilitates communication between components of system 100. Network 110 may connect one or more components of system 100. One or more portions of network 110 may include an ad-hoc network, the Internet, an intranet, an extranet, a portion of the PSTN, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined wide area network (SD-WAN), a metropolitan area network (MAN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a Wi-Fi network, etc. Network 110 may include a core network, an access network of a service provider, an Internet service provider (ISP) network, and the like. One or more components of system 100 may communicate over network 110.

In the illustrated embodiment of FIG. 1, network 110 includes a PSTN 112. PSTN 112 is a combination of telephone networks that provide infrastructure and services for public telecommunication. PSTN 112 is an aggregate of circuit-switched telephone networks that are interconnected by switching centers. PSTN 112 may include telephone lines, fiber optic cables, microwave transmission links, cellular networks, communications satellites, undersea telephone cables, switching centers, and the like. In certain embodiments, PSTN 112 is associated with one or more PSTN numbers. PTSN numbers are telephone numbers connected to PSTN 112.

Network 110 includes one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more physical devices, virtual machines, bare metal servers, and the like. As another example, nodes may include data communications equipment such as computers, routers, servers, printers, workstations, switches, bridges, modems, hubs, and the like. In the illustrated embodiment of FIG. 1, nodes include mobile device 120 and server 150.

Mobile device 120 of system 100 is any electronic equipment that can receive, create, process, store, and/or communicate information. Mobile device 120 may include one or more portable devices (e.g., mobile phones (e.g., smartphones), laptop computers, tablets, personal digital assistants (PDAs), tablets, wearable devices, etc.), vehicular communication systems, and the like. In certain embodiments, mobile device 120 includes an electronic display screen. For example, mobile device 120 may include a liquid crystal display (LCD), an organic light-emitting diode (OLED) flat screen interface, digital buttons, a digital keyboard, physical buttons, a physical keyboard, one or more touch screen components, a graphical user interface (GUI), and the like. Mobile device 120 may be located in any suitable location to receive and communicate information to user 122 of system 100.

User 122 of system 100 is a person who utilizes mobile device 120. User 122 may be a local user, a remote user, an administrator, a customer, a company, a combination thereof, and the like. In certain embodiments, user 122 is associated with one or more accounts. User 122 may be associated with an account name, a username, a login name, a screen name, one or more passwords, a user profile, etc. In certain embodiments, user 122 utilizes one or more applications downloaded to mobile device 120.

Mobile device 120 of system 100 runs one or more applications. Applications are computer software packages that perform specific functions for user 122 or for another application. Each application may be self-contained or may be a group of programs. In the illustrated embodiment of FIG. 1, the applications running on mobile device 120 include meetings application 130 and mobile device application 140.

Meetings application 130 of system 100 is a software platform that facilitates communication with participants of a meeting. In certain embodiments, meetings application 130 is web conferencing software. Meetings application 130 may be used to facilitate audio meetings, web conferences, video conferences, teleconferences, webinars, etc. In certain embodiments, user 122 downloads and/or installs meetings application 130 on mobile device 120. In some embodiments, meetings application 130 allows user 122 to speak and/or listen to audio over standard telephone lines or via computer microphones and speakers.

In certain embodiments, meetings application 130 registers with actions manager 160. For example, meetings application 130 may communicate a registration request 170 to actions manager 160. Registration request 170 may include one or more identifications (e.g., a name and ID) of meetings application 130, an identification of mobile device 120, an identification of user 122 of mobile device 120, and the like. In certain embodiments, once meetings application 130 registers with actions manager 160, meetings application 130 can communicate one or more triggers 132 to action manager 160.

Trigger 132 of system 100 is information that is used to trigger a set of actions in response to a particular event. In certain embodiments, meetings application 130 generates (e.g., creates) trigger 132 based on information associated with meetings application 130 (e.g., a calling party number and a required set of actions to answer the calling party number), information associated with mobile device application 140 (e.g., a name of mobile device application 140), and/or information associated with user 122 (e.g., a user identifier). In the illustrated embodiment of FIG. 1, trigger 132 includes target 134, event 136, and action set 138.

Target 134 represents information that is used to identify mobile device application 140. For example, target 134 may include information such as an identifier (e.g., a name) of mobile device application 140, an identifier (e.g., a user ID, a username, a user password, etc.) of user 122 of mobile device application 140, and the like.

Event 136 represents a request to join a meeting. For example, event 136 may include a calling party number such (e.g., a calling party number received from a collaboration cloud provider), a link, a calendar invitation, a chat room invitation, and the like. Event 136 may be associated with an audio meeting, a web conference, a video conference, a teleconference, a webinar, etc. In certain embodiments, event 136 represents the call from a service provider (e.g., a virtual collaboration meeting service provider) to user 122 who initiated a callback (e.g., a PSTN callback) within meetings application 130 (e.g., a virtual meeting application).

Action set 138 is the set of actions to be executed in the occurrence of event 136. Action set 138 may include at least one of the following actions: join a meeting (e.g., answer a call), enter a predetermined number (e.g., a dual tone multi-frequency (DTMF) number), enter a meeting ID, enter a meeting passcode, enter a phone conference ID, and the like. In certain embodiments, action set 138 includes one or more audio-related control settings. For example, action set 138 may include an action to mute mobile device 120 during the meeting. In certain embodiments, action set 138 is a preloaded sequence of actions. For example, action set 138 may be executed in a pre-defined sequence or order. In certain embodiments, one or more actions of action set 138 are preloaded. For example, if the DTMF number is known for meetings application 130 (e.g., WebEx meetings), meetings application 130 may use preloaded #1 as part of action set 138 to join the meeting. In some embodiments, meetings application 130 includes an action to enter an unspecified number in action set 138. The unspecified number may be later determined by actions manager 138 using natural language processing (NLP) and/or machine learning.

Mobile device application 140 of system 100 is software (e.g., a computer program) that performs action set 138. For example, mobile device application 140 may perform action set 138 in response to receiving instructions from actions manager 160. In certain embodiments, mobile device application 140 is a phone application. In some embodiments, meetings application 130 and mobile device application 140 are running on the same device (e.g., mobile device 120).

In certain embodiments, mobile device application 140 registers with actions manager 160. For example, mobile device application 140 may communicate a registration request 172 to actions manager 160. Registration request 172 may include one or more identifications (e.g., a name and ID) of mobile device application 140, an identification of mobile device 120, an identification of user 122 of mobile device 120, and the like. In certain embodiments, once mobile device application 140 registers with actions manager 160, mobile device application 140 can communicate event metadata 142 to action manager 160.

Event metadata 142 of system 100 is data that is collected by mobile device application 140 that is associated with event 136. For example, mobile device application 140 may collect event metadata 142 in response to receiving a call with a calling party number. Event metadata 142 may include the name of mobile device application 140, an identification of mobile device application 140, an identification of user 122, a number associated with event 136 (e.g., a calling party number of a collaboration cloud provider), a call recipient's phone number, a time of event 136 (e.g., a time that the calling party number was received), and the like. In certain embodiments, mobile device application 140 communicates event metadata 142 to actions manager 160 upon the occurrence of event 136. In certain embodiments, actions manager 160 is downloaded, installed, and/or running on mobile device 120. In some embodiments, actions manager 160 is downloaded, installed, and/or running on server 150.

Server 150 of system 100 is computer hardware or software (e.g., a computer program) that provides functionality for other programs or devices. In the illustrated embodiment of FIG. 1, server 150 provides services for mobile device 120. For example, server 150 may communicate information to and/or receive information from meetings application 130 of mobile device 120. As another example, server 150 may communicate information to and/or receive information from mobile device application 140 of mobile device 120. In certain embodiments, server 150 provides functionality (e.g., computations) for actions manager 160. In some embodiments, server 150 is a cloud server.

Actions manager 160 of system 100 is software (e.g., a computer program) that determines which (if any) actions to perform in the occurrence of event 136. In certain embodiments, actions manager 160 receives registration request 170 from meetings application 130 and determines, based on the information provided in registration request 170, whether to register meetings application 130. In some embodiments, actions manager 160 receives registration request 172 from mobile device application 140 and determines, based on the information provided in registration request 172, whether to register mobile device application 130.

Once meetings application 130 is registered with actions manager 160, actions manager 160 may receive meeting-related information from meetings application 130. In certain embodiments, actions manager 160 receives one or more triggers 132 from meetings application 130. Each trigger 132 may include target 134 (e.g., an identification of mobile device application 140), event 136 (e.g., a calling party number), and action set 138 (e.g., a set of actions to be performed in response to event 136). In certain embodiments, actions manager 160 stores one or more triggers 132 received from meetings application 130 in a database.

Once mobile device application 140 is registered with actions manager 160, actions manager 160 may receive event-related information from mobile device application 130. In certain embodiments, actions manager 160 receives event metadata 142 from mobile device application 140. For example, in response to the occurrence of event 136 (e.g., receiving a call from PSTN 112), mobile device application 140 may communicate event metadata 142 associated with event 136 to actions manager 160. In certain embodiments, actions manager 160 stores event metadata 142 received from mobile device application 140 in a database.

Actions manager 160 uses event metadata 142 to determine whether mobile device application 140 needs to take any specific action. In certain embodiments, actions manager 160 compares event metadata 142 with one or more existing active triggers 132 to determine whether to initiate action set 138. For example, actions manager 160 may compare the name or identification of mobile device application 140 received in event metadata 142 to target 134 of trigger 132 to determine whether they match. As another example, actions manager 160 may compare the calling party number received in event metadata 142 to the calling party number of event 136 of trigger 132 to determine whether they match. Event metadata 142 may match target 134 and/or event 136 if a predetermined threshold is satisfied (e.g., a certain percentage (e.g., 95% or 100%) of their characteristics match).

If actions manager 160) determines that event metadata 142 (e.g., an identification of mobile device application and a calling party number) matches target 134 and/or event 136 of trigger 132, actions manager 160 may communicate response 176 to mobile device application 120. In certain embodiments, response 176 instructs mobile device application 140 to perform action set 138 defined in trigger 132. Mobile device application 140 can then execute action set 138 (e.g., answer the call, mute the call, and enter the DTMF number), which provides a hands-free option for user 122 to join the meeting.

In certain embodiments, actions manager 160 determines one or more actions to be performed by mobile device 120. For example, if action set 138 includes an action of entering a DTMF number but does not specify the particular number, action manager 160 may perform NLP, machine learning, and the like to determine the correct number (e.g., 1, 5, etc.) to enter for the meeting. In some embodiments, one or more components of system 100 (e.g., meetings application 130 or actions manager 160) may scrape an invite (e.g., a calendar or email invite) to determine information such as meeting identifiers, passcodes, DTMF numbers, etc. In certain embodiments, the scraped information may be used to generate one or more actions in action set 138.

In operation, actions manager 160 receives registration request 170 from meetings application 130. Registration request 170 may include one or more identifications (e.g., a name and ID) of meetings application 130, an identification of mobile device 120, an identification of user 122 of mobile device 120, and the like. In response to receiving registration request 170 from meetings application 130, actions manager 160 registers meetings application 130. Actions manager 160 receives registration request 172 from mobile device application 140. Registration request 172 may include one or more identifications (e.g., a name and ID) of mobile device application 140, an identification of mobile device 120, an identification of user 122 of mobile device 120, and the like. In response to receiving registration request 172 from mobile device application 140, actions manager 160 registers mobile device application 140.

After meetings application 130 has registered with actions manager 160, actions manager 160 receives a request 174 from meetings application 130 to register trigger 132. Trigger 132 includes target 134, event 136, and action set 138. Target 134 may include one or more identifiers of mobile device application 140 and an identifier of user 122 of mobile device application 140, event 136 may include a calling party number, and action set 138 may include the following set of actions: answer the audio call, mute the audio call, and enter a predetermined DTMF number. Actions manager 160 registers trigger 132.

After mobile device application 130 has registered with actions manager 160, once event 136 occurs (e.g., mobile device application 140 receives a call with the calling party number), mobile device application 140 communicates event metadata 142 associated with event 136 to actions manager 160. Upon receiving event metadata 142 from mobile device application 140, actions manager 160 compares event metadata 142 to target 134 and event 136 of trigger 132. If event metadata 142 matches target 134 and event 136, action manager 160 communicates response 176 to mobile device application 140 instructing mobile device application 140 to perform action set 138 defined in trigger 132. As such, system 100 may be used to simplify the process of automatically joining user 122 to the meeting without interaction by user 122, which may avoid unnecessary distractions and ensure the safety of user 122 while user 122 is preoccupied (e.g., driving a vehicle).

Although FIG. 1 illustrates a particular number of networks 110, PSTNs 112, mobile devices 120, users 122, meetings applications 130, triggers 132, targets 134, action sets 138, mobile device applications 140, event metadata 142, servers 150, and actions managers 160, this disclosure contemplates any suitable number of networks 110, PSTNs 112, mobile devices 120, users 122, meetings applications 130, triggers 132, targets 134, action sets 138, mobile device applications 140, event metadata 142, servers 150, and actions managers 160. For example, actions manager 160 may communicate with several different mobile devices 120. As another example, meetings application 130 may include more than one trigger 132.

Although FIG. 1 illustrates a particular arrangement of network 110, PSTN 112, mobile device 120, user 122, meetings application 130, trigger 132, target 134, action set 138, mobile device application 140, event metadata 142, server 150, and actions manager 160, this disclosure contemplates any suitable arrangement of network 110, PSTN 112, mobile device 120, user 122, meetings application 130, trigger 132, target 134, action set 138, mobile device application 140, event metadata 142, server 150, and actions manager 160. For example, actions manager 160 may run on mobile device 120 instead of server 150.

Furthermore, although FIG. 1 describes and illustrates particular components, devices, or systems carrying out particular actions, this disclosure contemplates any suitable combination of any suitable components, devices, or systems carrying out any suitable actions.

Figure 2:
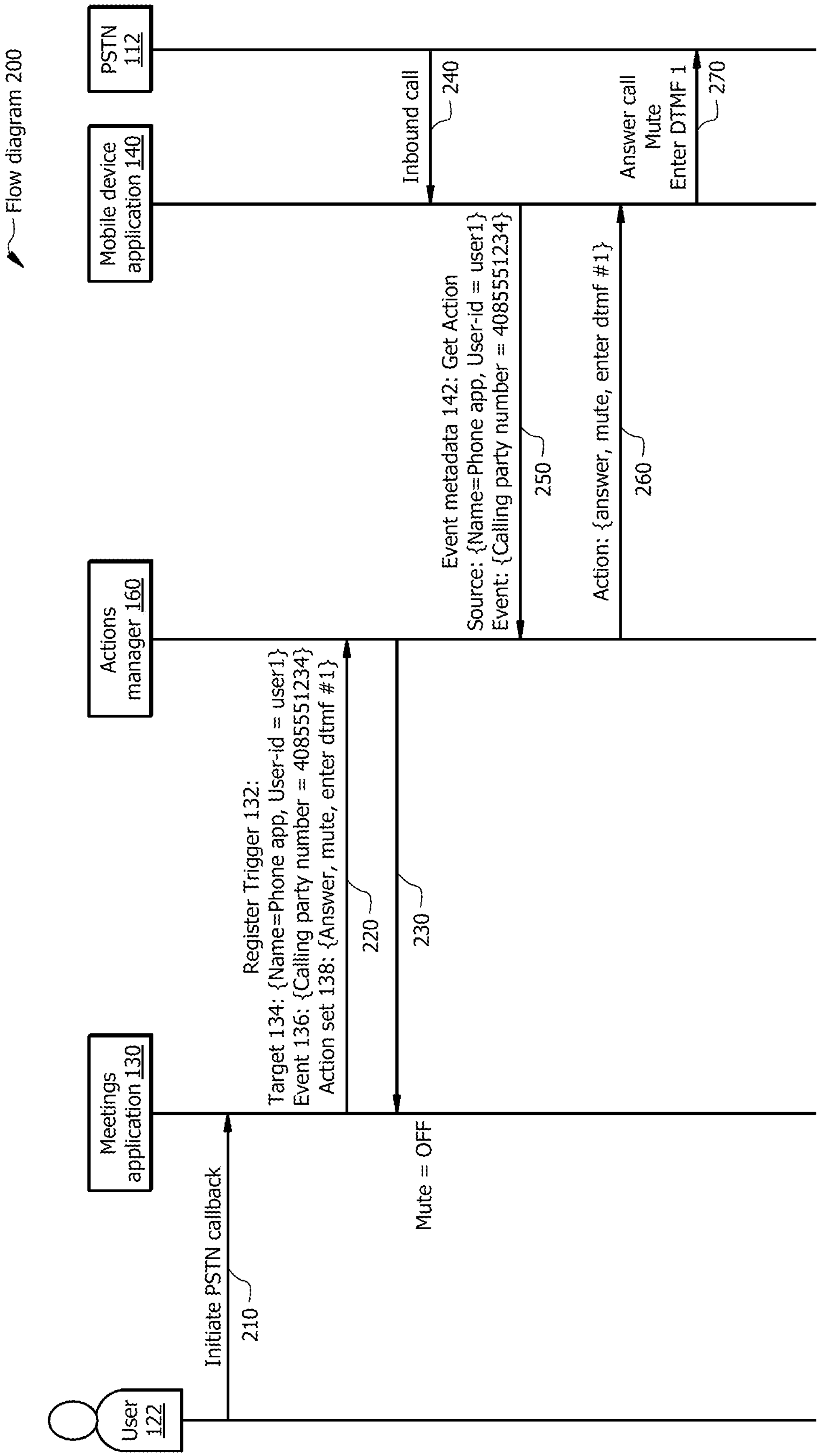
FIG. 2 illustrates a flow diagram for using a trigger and event metadata to join a meeting, in accordance with certain embodiments.

FIG. 2 illustrates a flow diagram 200 for using a trigger and event metadata to join a meeting, in accordance with certain embodiments. FIG. 2 includes user 122, meetings application 130, mobile device application 140, actions manager 160, and PSTN 112, which are described above in FIG. 1. Flow diagram 200 of FIG. 2 includes steps 210-through 270.

At step 210 of flow diagram 200, user 122 initiates a PSTN callback with meetings application 130. PSTN callback is a feature that allows user 122 to automatically connect to the audio bridge of a meeting over a PSTN connection. In certain embodiments, PSTN callback is a feature in meetings application 130 that can be turned on and/or off by user 122. In some embodiments, meetings application 130 is configured to automatically initiate PSTN callback to a specific user provided number whenever user 122 joins a meeting from meetings application 130. Flow diagram 200 then moves from step 210 to step 220.

At step 220 of flow diagram 200, meetings application 130 registers trigger 132 with actions manager 160. For example, referring to FIG. 1, meetings application 130 may communicate request 174 to register trigger 132, which may include target 134 (e.g., one or more identifiers of mobile device application 140), event 136 (e.g., a PSTN calling number), and action set 138 (e.g., answer, mute, and enter a predetermined DTMF number). In certain embodiments, meetings application 130 registers with actions manager 160 prior to registering trigger 132 with actions manager 160. In some embodiments, actions manager 160 stores trigger 132 (target 134, event 136, and action set 138) in a database. Flow diagram 200 then moves from step 220 to step 230.

At step 230 of flow diagram 200, actions manager 160 sends a response (e.g., "OK") to meetings application 130 acknowledging that actions manager 160 has registered trigger 132. In response to receiving the acknowledgment, meetings application 130 turns mute off. Disabling mute on meeting application 130 may avoid double muting during the meeting. Flow diagram 200 then moves from step 230 to step 240.

At step 240 of flow diagram 200, mobile device application 140 receives an inbound call via PSTN 112. For example, mobile device application 140 may receive a call from a calling party number. Flow diagram 200 then moves from step 240 to step 250, where mobile device application 140 communicates event metadata 142 to actions manager 160 in response to receiving the inbound call from PSTN 112. Event metadata 142 includes the source (e.g., the name of mobile device application 140 and the identification of user 122 of mobile device 120) and an event (e.g., the PSTN calling party number). In some embodiments, actions manager 160 stores event metadata 142 in a database.

In response to receiving event metadata 142 from mobile device application 140, action manager 160 compares event metadata 142 to target 134 and event 136 of trigger 132. For example, action manager 160 may compare the source of metadata 142 to target 134 and the event of metadata 142 to event 136 of trigger 132 to determine if the information matches. Flow diagram 200 then moves from step 250 to step 260.

At step 260 of flow diagram 200, in response to determining that event metadata 142 matches target 134 and event 136 of trigger 132, actions manager 160 communicates a response to mobile device application 140 instructing mobile device application 140 to perform action set 138. For example, referring to FIG. 1, actions manager 160 may communicate response 174 to mobile device application 140 instructing mobile device application to answer the PSTN call, mute the call, and enter DTMF #1. Flow diagram 200 then moves from step 260 to step 270.

At step 270 of flow diagram 200, mobile device application 140 performs action set 138. For example, mobile device application 140 may automatically answer the PSTN call, mute the call, and enter DTMF #1 in accordance with action set 138 received from actions manager 160. As such, flow diagram 200 may be used to automatically join user 122 to an audio call without interaction by user 122, which may avoid unnecessary distractions and ensure the safety of user 122 while user 122 is preoccupied (e.g., driving a vehicle).

Although this disclosure describes and illustrates particular steps flow diagram 200 of FIG. 2 as occurring in a particular order, this disclosure contemplates any suitable steps of flow diagram 200 of FIG. 2 occurring in any suitable order.

Although this disclosure describes and illustrates an example flow diagram for using a trigger and event metadata to join a meeting including the particular steps of the flow diagram of FIG. 2, this disclosure contemplates any suitable flow diagram for using a trigger and event metadata to join a meeting including any suitable steps, which may include all, some, or none of the steps of the method of FIG. 2, where appropriate. For example, flow diagram 200 may include additional steps directed to registering meetings application 130 and/or mobile device application 140 with actions manager 160.

Furthermore, although FIG. 2 describes and illustrates particular components, devices, or systems carrying out particular actions, this disclosure contemplates any suitable combination of any suitable components, devices, or systems carrying out any suitable actions.

Figure 3:
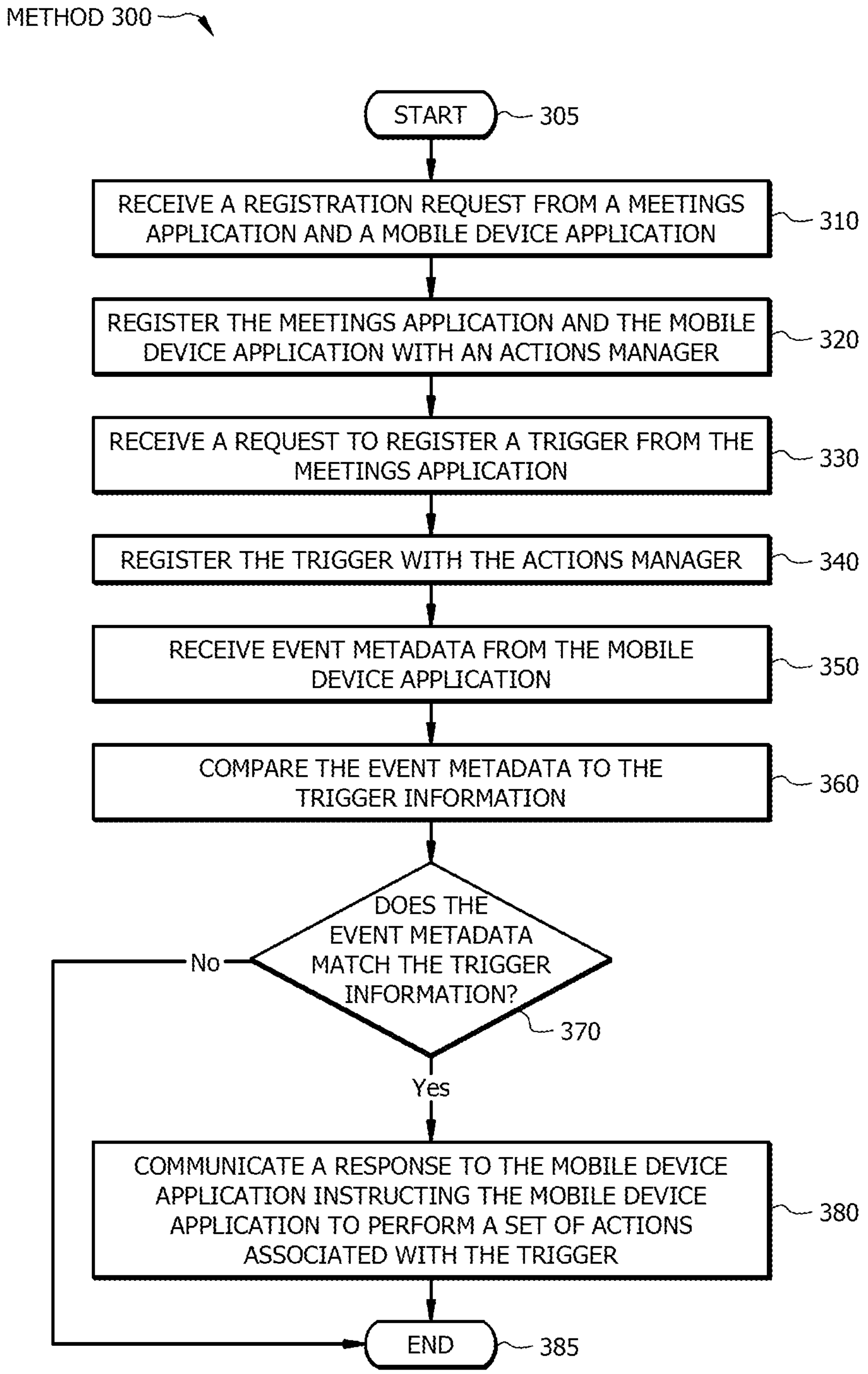
FIG. 3 illustrates a method for using a trigger and event metadata to join a meeting, in accordance with certain embodiments.

FIG. 3 illustrates a method 300 for using a trigger and event metadata to join a meeting, in accordance with certain embodiments. FIG. 3 may use one or more of the elements of FIG. 1. Method 300 begins at step 305. At step 310, the actions manager receives a registration request from a meetings application and a mobile device application.

For example, referring to FIG. 1, actions manager 160 may receive registration request 170 and registration request 172 from meetings application 130 and mobile device application 140, respectively, via network 110. The registration request received from the meetings application may include one or more identifications (e.g., a name and ID) of the meetings application, an identification of the mobile device associated with the meetings application, an identification of the user of the mobile device, and the like. The registration request received from the mobile device application may include one or more identifications (e.g., a name and ID) of the mobile device application, an identification of the mobile device associated with the mobile device application, an identification of the user of the mobile device, and the like. In certain embodiments, the meeting application and the mobile device application both run on the same mobile device. Method 300 then moves from step 310 to step 320.

At step 320 of method 300, the actions manager registers the meetings application and mobile device application. For example, referring to FIG. 1, actions manager 160 may use information (e.g., one or more identifications of the meetings application, an identification of the mobile device associated with the meetings application, an identification of the user of the mobile device, etc.) received from meetings application 130 to register meetings application 130. As another example, referring to FIG. 1, actions manager 160 may use information (e.g., one or more identifications of the mobile device application, an identification of the mobile device associated with the mobile device application, an identification of the user of the mobile device, etc.) received from mobile device application 140 to register mobile device application 140. Method 300 then moves from step 320 to step 330.

At step 330 of method 300, actions manager 160 receives a request from the meetings application to register a trigger. For example, referring to FIG. 1, actions manager 160 may receive request 172 from meetings application 130 to register trigger 132. In certain embodiments, the trigger includes a target (e.g., one or more identifiers of the mobile device application and/or an identifier of the user of the mobile device application), an event (e.g., a calling party number), and an action set (e.g., answer, mute, and enter a predetermined DTMF number). Method 300 then moves from step 330 to step 340.

At step 340 of method 300, the actions manager registers the trigger. For example, referring to FIG. 1, actions manager 160 may register trigger 132 by storing information associated with trigger 132, such as target 134, event 136, and action set 138. Method 300 then moves from step 340 to step 350, where the actions manager receives event metadata from the mobile device application. For example, referring to FIG. 1, once event 136 occurs (e.g., mobile device application 140 receives the calling party number), mobile device application 140 may communicate event metadata 142 associated with event 136 to actions manager 160. Method 300 then moves from step 350 to step 360.

At step 360 of method 300, upon receiving the event metadata from the mobile device application, the actions manager compares the event metadata to the trigger information received from the meetings application. For example, referring to FIG. 1, upon receiving event metadata 142 from mobile device application 140, actions manager 160 may compare event metadata 142 to target 134 and event 136 of trigger 132 to determine whether the source and event of event metadata 142 match target 134 and event 136 of trigger 132, respectively. Method 300 then moves from step 360 to step 370.

At step 370 of method 300, the actions manager determines, based on the comparison, whether the event metadata matches the trigger information. For example, referring to FIG. 1, actions manager 160 may determine whether the source of event metadata 142 matches target 134 of trigger 132. As another example, referring to FIG. 1, actions manager 160 may determine whether the event of event metadata 142 matches event 136 of trigger 132.

If, at step 370, the actions manager determines that the event metadata and the trigger information match, method 300 moves from step 370 to step 380, where the action manager communicates a response to the mobile device application instructing the mobile device application to perform a certain set of actions. For example, referring to FIG. 1, action manager 160 may communicate response 176 to mobile device application 140 instructing mobile device application 140 to answer, mute, and enter a predetermined DTMF number, as defined by action set 138 of trigger 132. Method 300 then moves from step 380 to step 385, where method 300 ends. If, at step 370, actions manager determines that the event metadata and the trigger information do not match, method 300 advances from step 370 to step 385, where method 300 ends. As such, method 300 may be used to simplify the process of automatically joining the user of the mobile device to the meeting without interaction by the user, which may avoid unnecessary distractions and ensure the safety of user while the user is preoccupied (e.g., driving a vehicle).

Although this disclosure describes and illustrates particular steps method 300 of FIG. 3 as occurring in a particular order, this disclosure contemplates any suitable steps of method 300 of FIG. 3 occurring in any suitable order. Although this disclosure describes and illustrates an example method for using a trigger and event metadata to join a meeting including the particular steps of the method of FIG. 3, this disclosure contemplates any suitable method for using a trigger and event metadata to join a meeting including any suitable steps, which may include all, some, or none of the steps of the method of FIG. 3, where appropriate. Furthermore, although FIG. 3 describes and illustrates particular components, devices, or systems carrying out particular actions, this disclosure contemplates any suitable combination of any suitable components, devices, or systems carrying out any suitable actions.

Figure 4:
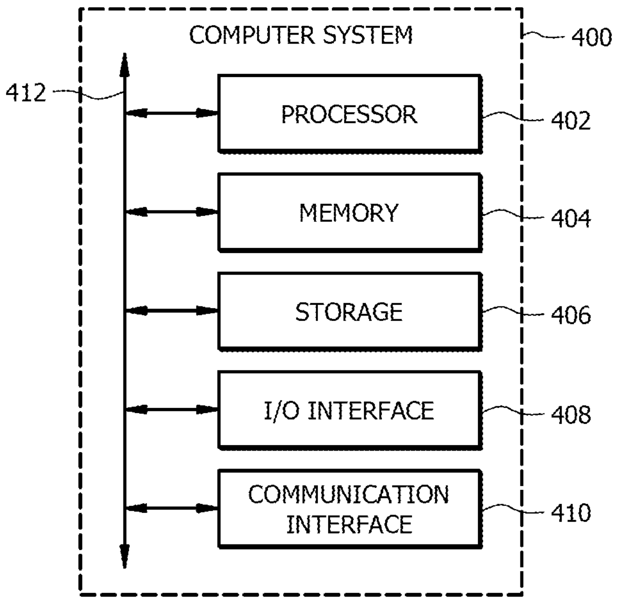
FIG. 4 illustrates a computer system that may be used by the systems and methods described herein, in accordance with certain embodiments.

FIG. 4 illustrates an example computer system 400. In particular embodiments, one or more computer system 400 perform one or more steps of one or more methods described or illustrated herein. In particular embodiments, one or more computer system 400 provide functionality described or illustrated herein. In particular embodiments, software running on one or more computer system 400 performs one or more steps of one or more methods described or illustrated herein or provides functionality described or illustrated herein. Particular embodiments include one or more portions of one or more computer system 400. Herein, reference to a computer system may encompass a computing device, and vice versa, where appropriate. Moreover, reference to a computer system may encompass one or more computer systems, where appropriate.

This disclosure contemplates any suitable number of computer system 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer system 400: be unitary or distributed: span multiple locations: span multiple machines: span multiple data centers: or reside in a cloud, which may include one or more cloud components in one or more networks. Where appropriate, one or more computer system 400 may perform without substantial spatial or temporal limitation one or more steps of one or more methods described or illustrated herein. As an example and not by way of limitation, one or more computer system 400 may perform in real time or in batch mode one or more steps of one or more methods described or illustrated herein. One or more computer system 400 may perform at different times or at different locations one or more steps of one or more methods described or illustrated herein, where appropriate.

In particular embodiments, computer system 400 includes a processor 402, processor 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, processor 404, or storage 406; decode and execute them: and then write one or more results to an internal register, an internal cache, processor 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in processor 404 or storage 406, and the instruction caches may speed up retrieval of those instructions by processor 402. Data in the data caches may be copies of data in processor 404 or storage 406 for instructions executing at processor 402 to operate on: the results of previous instructions executed at processor 402 for access by subsequent instructions executing at processor 402 or for writing to processor 404 or storage 406: or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs): be a multi-core processor: or include one or more processors 402. Although this disclosure describes and illustrates a particular processor, this disclosure contemplates any suitable processor.

In particular embodiments, processor 404 includes main memory for storing instructions for processor 402 to execute or data for processor 402 to operate on. As an example and not by way of limitation, computer system 400 may load instructions from storage 406 or another source (such as, for example, another computer system 400) to processor 404. Processor 402 may then load the instructions from processor 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to processor 404. In particular embodiments, processor 402 executes only instructions in one or more internal registers or internal caches or in processor 404 (as opposed to storage 406 or elsewhere) and operates only on data in one or more internal registers or internal caches or in processor 404 (as opposed to storage 406 or elsewhere). One or more memory buses (which may each include an address bus and a data bus) may couple processor 402 to processor 404. Bus 412 may include one or more memory buses, as described below. In particular embodiments, one or more memory management units (MMUs) reside between processor 402 and processor 404 and facilitate accesses to processor 404 requested by processor 402. In particular embodiments, processor 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Processor 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer system 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a Wi-Fi network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network element, comprising:

one or more processors; and one or more computer-readable non-transitory storage media coupled to the one or more processors and comprising instructions that, when executed by the one or more processors, cause the network element to perform operations comprising:

receiving, from a meetings application, a request to register a trigger, wherein:

the trigger comprises a target, an event, and an action set; and the action set represents a preloaded sequence of actions;

registering the trigger with an actions manager;

receiving, from a mobile device application, event metadata;

comparing the event metadata to the target and the event of the trigger;

in response to determining that the event metadata matches the target and the event of the trigger, communicating a response comprising the action set to the mobile device application; and instructing, via the response, the mobile device application to automatically perform the preloaded sequence of actions in the action set in a pre-defined order, wherein the action set joins a user to a meeting without interaction from the user.

2. The network element of claim 1, the operations further comprising:

determining, in response to comparing the event metadata to the trigger, that the event of the trigger matches the event metadata.

3. The network element of claim 1, the operations further comprising:

receiving a first registration request from the meetings application;

registering the meetings application with the actions manager;

receiving a second registration request from the mobile device application; and registering the mobile device application with the actions manager.

4. The network element of claim 1, wherein:

the target comprises at least one of the following identifiers:

a first identifier of the mobile device application; and a second identifier of a user of the mobile device application;

the event comprises a calling party number; and the preloaded sequence of actions in the action set in a pre-defined order comprises the following actions in the following order:

answer, mute, and enter a predetermined dual tone multi-frequency (DTMF) number.

5. The network element of claim 1, wherein the meetings application and the mobile device application are stored on one of the following:

a mobile device; or a vehicular communication system.

6. The network element of claim 1, wherein the actions manager represents one of the following:

a cloud service;

an application stored on a mobile device; or an application stored on a vehicular communication system.

7. The network element of claim 1, wherein the action set is associated with a public switched telephone network (PSTN) audio connection.

8. A method, comprising:

receiving, from a meetings application, a request to register a trigger, wherein:

the trigger comprises a target, an event, and an action set; and the action set represents a preloaded sequence of actions;

registering the trigger with an actions manager;

receiving, from a mobile device application, event metadata;

comparing the event metadata to the target and the event of the trigger;

in response to determining that the event metadata matches the target and the event of the trigger, communicating a response comprising the action set to the mobile device application; and instructing, via the response, the mobile device application to automatically perform the preloaded sequence of actions in the action set in a pre-defined order, wherein the action set joins a user to a meeting without interaction from the user.

9. The method of claim 8, further comprising:

determining, in response to comparing the event metadata to the trigger, that the event of the trigger matches the event metadata.

10. The method of claim 8, further comprising:

receiving a first registration request from the meetings application;

registering the meetings application with the actions manager;

receiving a second registration request from the mobile device application; and registering the mobile device application with the actions manager.

11. The method of claim 8, wherein:

the target comprises at least one of the following identifiers:

a first identifier of the mobile device application; and a second identifier of a user of the mobile device application;

the event comprises a calling party number; and the preloaded sequence of actions in the action set in a pre-defined order comprises the following actions in the following order:

answer, mute, and enter a predetermined dual tone multi-frequency (DTMF) number.

12. The method of claim 8, wherein the meetings application and the mobile device application are stored on one of the following:

a mobile device; or a vehicular communication system.

13. The method of claim 8, wherein the actions manager represents one of the following:

a cloud service;

an application stored on a mobile device; or an application stored on a vehicular communication system.

14. The method of claim 8, wherein the action set is associated with a public switched telephone network (PSTN) audio connection.

15. One or more computer-readable non-transitory storage media embodying instructions that, when executed by a processor, cause the processor to perform operations comprising:

receiving, from a meetings application, a request to register a trigger, wherein:

the trigger comprises a target, an event, and an action set; and the action set represents a preloaded sequence of actions;

registering the trigger with an actions manager;

receiving, from a mobile device application, event metadata;

comparing the event metadata to the target and the event of the trigger;

in response to determining that the event metadata matches the target and the event of the trigger, communicating a response comprising the action set to the mobile device application; and instructing, via the response, the mobile device application to automatically perform the preloaded sequence of actions in the action set in a pre-defined order, wherein the action set joins a user to a meeting without interaction from the user.

16. The one or more computer-readable non-transitory storage media of claim 15, the operations further comprising:

determining, in response to comparing the event metadata to the trigger, that the event of the trigger matches the event metadata.

17. The one or more computer-readable non-transitory storage media of claim 15, the operations further comprising:

receiving a first registration request from the meetings application;

registering the meetings application with the actions manager;

receiving a second registration request from the mobile device application; and registering the mobile device application with the actions manager.

18. The one or more computer-readable non-transitory storage media of claim 15, wherein:

the target comprises at least one of the following identifiers:

a first identifier of the mobile device application; and a second identifier of a user of the mobile device application;

the event comprises a calling party number; and the preloaded sequence of actions in the action set in a pre-defined order comprises the following actions in the following order:

answer, mute, and enter a predetermined dual tone multi-frequency (DTMF) number.

19. The one or more computer-readable non-transitory storage media of claim 15, wherein the meetings application and the mobile device application are stored on one of the following:

a mobile device; or a vehicular communication system.

20. The one or more computer-readable non-transitory storage media of claim 15, wherein the actions manager represents one of the following:

a cloud service;

an application stored on a mobile device; or an application stored on a vehicular communication system.

* * * * *